April 21, 1942.                    F. C. YOUNG                    2,280,275
                              VEHICLE SIGNAL DEVICE
                               Filed Nov. 5, 1940
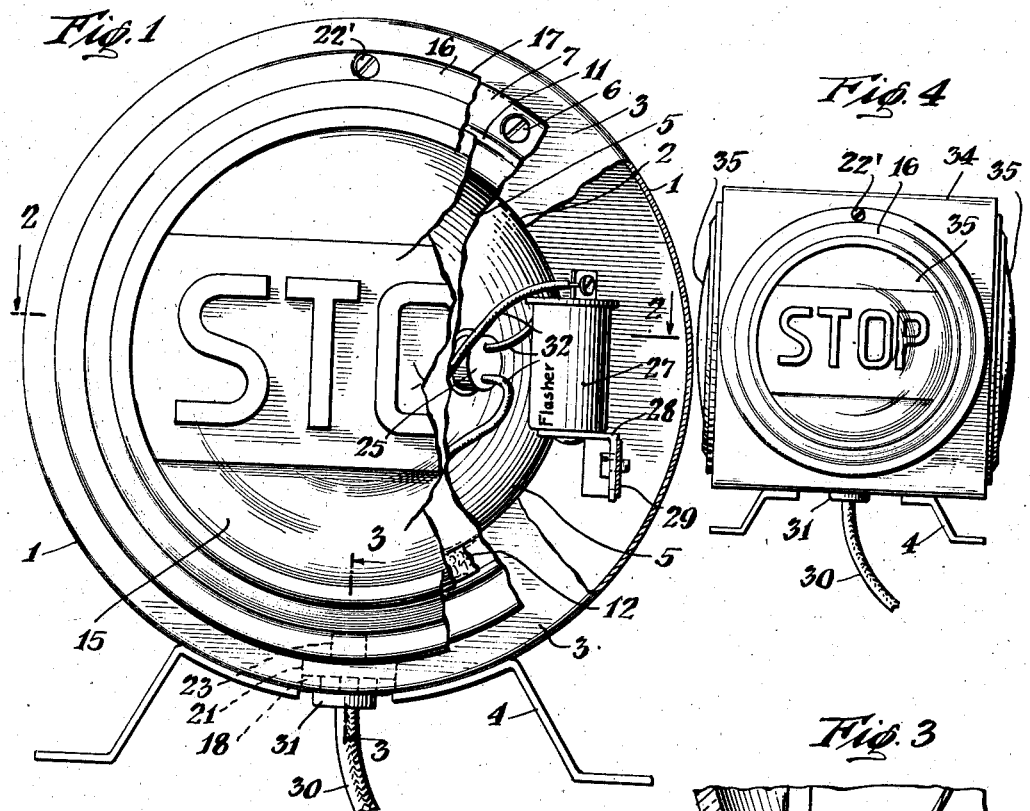
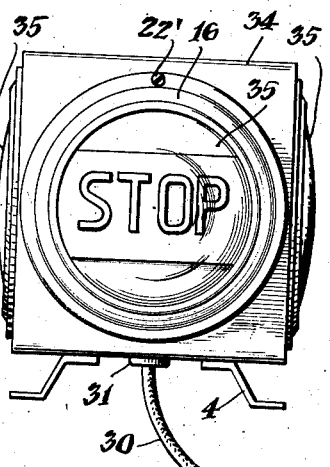
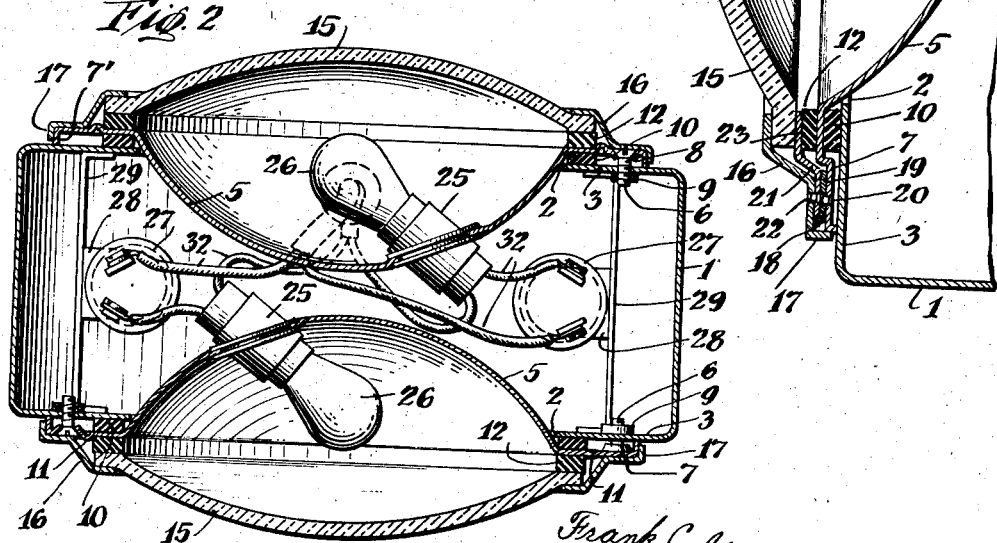
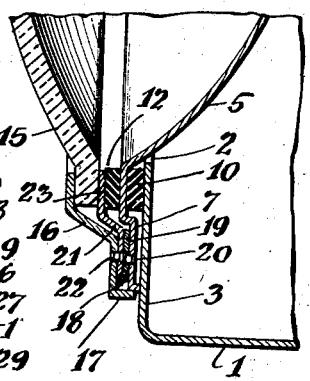
Frank C. Young, INVENTOR
BY
Charles W. Mortimer, ATTORNEY Patented Apr. 21, 1942

2,280,275

UNITED STATES PATENT OFFICE 2,280,275

VEHICLE SIGNAL DEVICE

Frank C. Young, Cranford, N. J.

Application November 5, 1940, Serial No. 364,413

5 Claims. (Cl. 177—329)

This invention relates to a signal device that is particularly useful for being carried upon a vehicle such as a truck, for example. It is adapted to be observed from opposite directions, and is preferably mounted upon the top of a vehicle or truck.

In carrying out this invention a casing is provided which has a support to be attached to the vehicle, and separate electric lights are enclosed in the casing and so disposed that the warning signal is observable from opposite directions or can be seen either from the front or the rear. In a modification of the invention, the signal can be seen not only from the front or the rear, but also from opposite sides. An electric light is provided for giving the signal in each direction, and these lights are so connected that when one of them goes out the other one is not necessarily extinguished.

The invention will be understood from the description in connection with the accompanying drawing, in which:

Fig. 1 is an end view, partly broken away, showing an illustrative embodiment of the invention;

Fig. 2 is a section along the line 2—2 of Fig. 1;

Fig. 3 is a section on an enlarged scale along the line 3—3 of Fig. 1, showing some of the details; and Fig. 4 is an end view on a small scale showing a modification.

In the drawing, reference character 1 indicates a cylindrically shaped casing or housing having openings 2 in opposite ends thereof, leaving annular flanges 3.

A bracket 4 is provided for supporting the casing 1 and is attached thereto in any convenient way, and by means of this bracket the casing may be attached to the top of a truck, or other places where the device is needed or is to be used.

A metal reflector 5 with a polished inside surface is mounted in each opening 2 and extends to some extent into the casing 1. Screws 6 extend through the metal flanges 7 of the reflectors 5 for attaching them to the flanges 3 of the casing 1. Short radially extending flanges 7' are provided at the edges of the flanges 7 to bear against the sides of the flanges 3. Countersunk holes 8 are provided so that the heads of the screws 6 can be made flush with the outer surface of the flanges 7. Nuts 9 are provided on the inside of the flanges 3 for keeping the screws 6 securely in place. Circular gaskets or sealing rings 10 of soft rubber or other resilient waterproof material are provided between the flanges 3 and 7. These gaskets are preferably attached to the flanges 7 by adhesive. Circular beads 11 are provided on the flanges 7 outside of the gaskets 10. Another gasket or sealing means 12 similar to the gasket 10 is provided on the other side of each flange 7 from the gasket 10, and attached to the flanges 7 in a similar way.

Lenses 15, preferably of red glass or other translucent or transparent material to provide a caution or stop signal, for example, are provided for the reflectors 5. A metal rim or flange 16 is provided for holding each lens 15 in place. The edge 17 of each member 16 extends around the edge of each flange 7.

A hinge 18 (Fig. 3) is provided between each flange 7 and rim 16 at the bottom of the flanges 7. One wing 19 of the hinge 18 is riveted to the flange 7 of the reflector 5, as shown at 20, and the other wing 21 of this hinge is riveted to the metal rim 16 of the lens, as shown at 22. The wing 21 extends upwardly, as shown at 23, a sufficient distance to clamp the lower edge of the lens 15 between it and the rim 16. The opposite edge of the lens 15 may be attached to the rim 16 in any convenient way, when necessary and desirable. A screw 22' (Fig. 1) through the flange 16 passes into a threaded hole in the flange 7 for holding the two together, with the gasket 12 clamped between the flange 7 and the rim of the lens 15.

A lamp socket 25 is mounted on each reflector 5 and passes through the same. These lamp sockets 25 are mounted eccentrically of the reflectors 5, and are so positioned that they do not interfere with or prevent the reflectors from being placed near each other, thus enabling the housing 1 to be made shorter. A lamp bulb 26 is provided for each socket 25, and the sockets are so placed that the electric lights will be located along the center line of the reflectors and in position to illuminate the signals on the lenses 15. A flasher 27 is provided for each lamp bulb 26. Each flasher is supported by a bracket 28 inside of the casing 1 on a cross-piece 29 that is attached to the casing. An electric cable 30 passes through a rubber protector 31 or the like at the bottom of the housing 1, this protector being located in a hole in the housing. Wires 32 from the cable 1 connect the flashers 27 and lamp bulbs 26 in series in the well known way.

In the modification shown in Fig. 4, the housing 34 is made square or in the shape of a box-like casing having pairs of lenses 35 on opposite sides thereof. The flashers, lamp bulbs, etc., in this modification are like those already described.

In this modification, signals are given to cars or pedestrians approaching from side or cross roads, as well as to the front and rear along the road on which the vehicle carrying this signal device passes.

The lamp bulbs may be illuminated by current from the battery on the car, and different arrangements may be made for closing the circuit through the lamp bulbs. For example, the circuits may be closed when the ignition switch is turned or when the brake pedal is applied or when the vehicle is set in motion, or any other convenient way. Since the particular connections for lighting the lamp bulbs from the battery do not constitute any portion of this invention, they are not described in detail.

If one of the lamps 26 burns out, it can be quickly replaced by unscrewing the screw 22' and turning the rim 16 and lens 15 on the hinge 18, whereupon ready access to the lamp is given. When the lamp bulb is replaced, the lens can be quickly swung on the hinge 18 and secured in place. The screws 6 can be removed, after the lens 15 is swung back, so as to gain access to the inside of the casing or housing 1.

What is claimed is:

1. In a signal device, a cylindrical casing composed entirely of thin metal having radially extending internally directed flanges at the ends thereof, circularly shaped reflectors of thin metal having radially extending flanges with axially extending short flanges at the outer edges thereof with the ends of said short flanges resting against the sides of said first named flanges, and removable means passing through the radially extending flanges of said reflectors and said first named flanges to keep them in assembled relation.

2. In a signal device, a cylindrical casing composed entirely of thin metal having radially extending internally directed flanges at the ends thereof, circularly shaped reflectors of thin metal having radially extending flanges with axially extending short flanges at the outer edges thereof with the ends of said short flanges resting against the sides of said first named flanges, removable means passing through the radially extending flanges of said reflectors and said first named flanges to keep them in assembled relation, and lamp sockets mounted on said reflectors radially displaced with respect to each other.

3. In a signal device, a cylindrical casing composed entirely of thin metal having radially extending internally directed flanges at the ends thereof, circularly shaped reflectors of thin metal having radially extending flanges with axially extending short flanges at the outer edges thereof with the ends of said short flanges resting against the sides of said first named flanges, removable means passing through the radially extending flanges of said reflectors and said first named flanges to keep them in assembled relation, and ring shaped resilient seals between the sides of said first named flanges and inside said axially extending flanges.

4. In a signal device, a cylindrical casing composed entirely of thin metal having radially extending internally directed flanges at the ends thereof, circularly shaped reflectors of thin metal having radially extending flanges with axially extending short flanges at the outer edges thereof with the ends of said short flanges resting against the sides of said first named flanges, removable means passing through the radially extending flanges of said reflectors and said first named flanges to keep them in assembled relation, and ring shaped seals between the edges of said first named flanges and said reflectors.

5. In a signal device, a cylindrical casing composed entirely of thin metal having its diameter greater than its length and having radially extending internally directed flanges at the ends thereof, circularly shaped reflectors of thin metal having radially extending flanges with axially extending short flanges at the outer edges thereof with the ends of said short flanges resting against the sides of said first named flanges, and removable means passing through the radially extending flanges of said reflectors and said first named flanges to keep them in assembled relation.

FRANK C. YOUNG.